United States Patent Office 3,743,578
Patented July 3, 1973

3,743,578
DEVICE FOR ATTACHING NUCLEAR FUEL PINS IN AN ASSEMBLY
Jean-Claude Agrainer, Cornillon-Confoux, and André Cayol, Aix-en-Provence, France, assignors to Commissariat a l'Energie Atomique, Paris, France
Filed Sept. 14, 1970, Ser. No. 72,000
Claims priority, application France, Sept. 19, 1969, 6932031
Int. Cl. G21c 3/32
U.S. Cl. 176—78                     9 Claims

ABSTRACT OF THE DISCLOSURE

A fuel assembly comprises a bundle of fuel pins grouped contiguously in a regular pattern and a shroud. A device for retaining the fuel pins comprises two parallel spindles attached to the shroud and disposed transversely of the direction of circulation of the coolant and parallel rails disposed perpendicularly to the spindles and sliding thereon and in the plugs of a layer of pins.

---

The invention relates to an attaching device for connecting the fuel rods to a support in a fuel assembly of the kind comprising a bundle of fuel pins grouped contiguously in a regular pattern.

Fuel assemblies adapted for use in high power density nuclear reactors, such as breeder reactors cooled by the circulation of molten metal, comprise one or more bundles of canned fuel pins (fissile or fertile material) disposed in a jacket through which the fluid coolant flows. The pins must be retained in the jacket. As a rule, the pins of each bundle are mounted on a grid carried by the base of the jacket or by a ring attached to the straight portion thereof. The distance apart between the pins is determined by spacing members associated therewith and as a rule formed by a wire helically wound on each pin.

In the majority of prior art arrangements, the fuel pins had to be threaded individually on to the grid. Clearly, this method has considerable disadvantages, since the operations must as a rule be performed in glove boxes.

It is therefore an object of the present invention to provide an attaching device which meets practical requirements more satisfactorily than the prior art devices, and which more particularly, is substantially free from the aforementioned disadvantages.

To this end the invention provides an attaching device adapted to attach the fuel pins in a fluid coolant guide jacket, in a fuel assembly comprising a bundle of fuel pins grouped contiguously in a regular pattern, said device comprising at least two parallel spindles which are attached to a support unitary with the jacket and are disposed transversely of the direction of circulation of the coolant, the device also comprising parallel rails disposed perpendicularly to the spindles and sliding thereon and in the plugs of a layer of pins to retain the pins.

The jacket encloses the bundle to prevent the pins from sliding off the rails and the rails from sliding off the spindles. The support is advantageously formed by a tubular handling unit detachably fixed to the jacket.

The invention will be more clearly understood from the following description of an exemplary embodiment thereof, with reference to the accompanying drawings, wherein.

Figure 1:
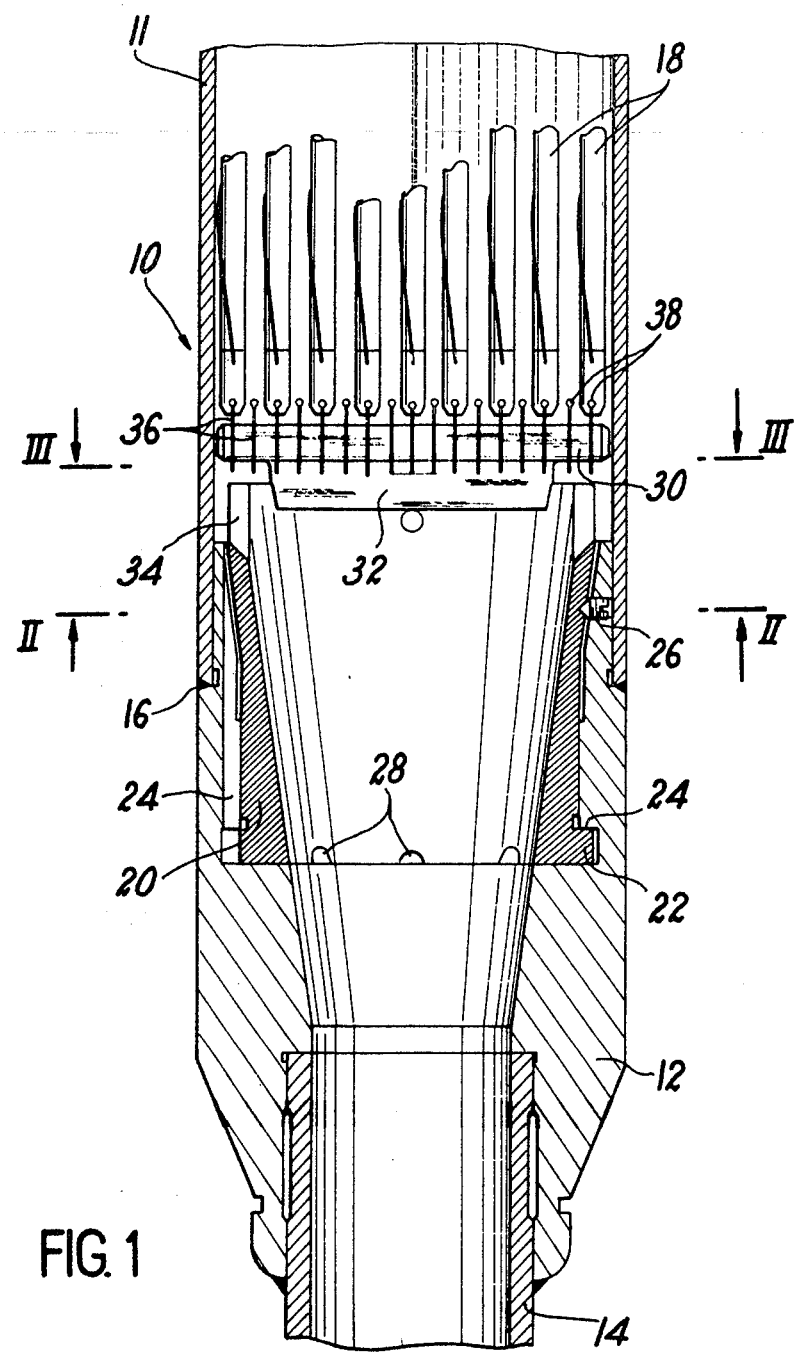
FIG. 1 is a view in longitudinal section of the lower end portion of a fuel assembly.

A fuel assembly, the lower end portion of which is shown in FIG. 1, comprises a jacket 10 formed by a sheath 11 of regular hexagonal cross-section and a solid base 12 which is continued by a tube 14 through which coolant enters. The sheath 11 is attached to the base 12 by welding at a place 16. The base 12 is formed with a central passage through which a fluid coolant enters the jacket 10, the passage being of slightly flared shape and connected to the bore of the tube 14.

Figure 5:
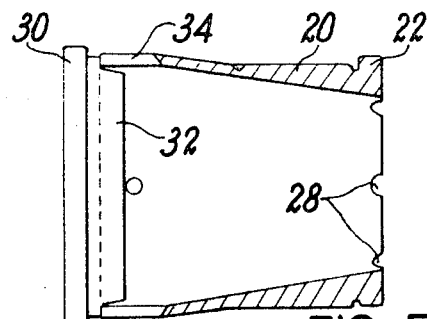
FIGS. 4 and 5 are an elevation and a section taken along the line V—V in FIG. 4 respectively of the handling unit of the attaching device illustrated in FIGS. 1–3.
Figure 3:
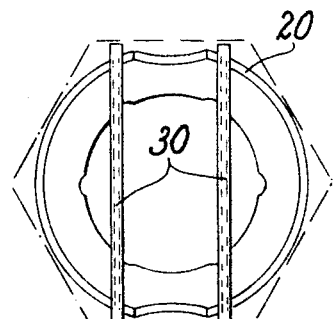
FIGS. 2 and 3 are sectional views, taken along the lines II—II and III—III in FIG. 1 respectively.

Disposed in the jacket 10 is a bundle of fuel pins 18 occupied by fissile or fertile material, the bundle being retained in the jacket by the device according to the invention. The device comprises a handling unit 20 illustrated in FIGS. 1, 4 and 5. The handling unit comprises means for releasable attachment to the base 12, formed in the embodiment illustrated by tenons 22 which are inserted in L-shaped grooves 24 in the base 12 to form a bayonet-type coupling. Once it is in place, the handling unit can be locked by a clamping screw 26 or by pins mounted radially in holes in the base 12, beneath the sheath 11. Notches 28 with which the lower surface of the handling unit 20 is formed enable the coolant to flow away when the assembly is lifted out of the sunken core.

The handling unit 20 has two parallel spindles 30 each formed by a cylindrical member having a length such that the body slightly extends beyond the handling unit 20, although it remains inscribed in the sheath 11, the spindles also having longitudinal and radial ribs 32. The latter engages in notches with which the handling unit 20 is formed for this purpose and is welded to the unit. Between the two notches, the handling unit 20 has two wide grooves 34 facilitating the distribution of the coolant entering via the base 12.

Figure 4:
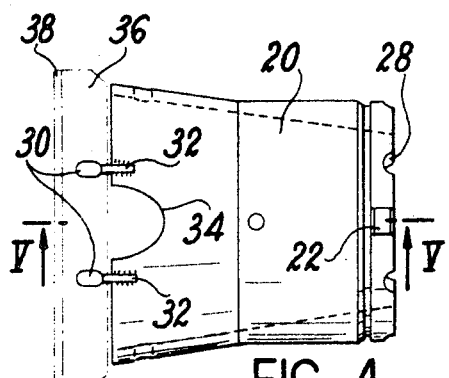
Figure 2:
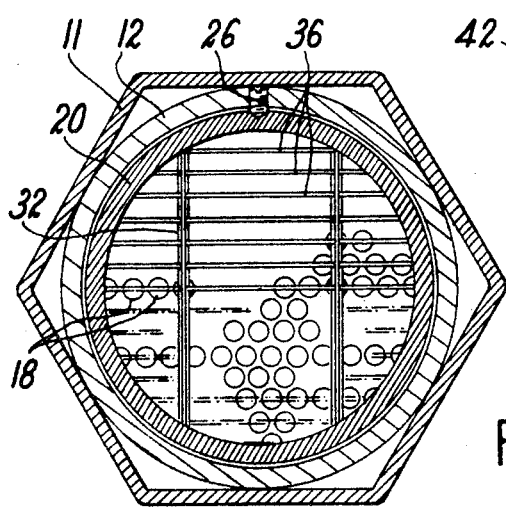

Sliding on the spindles 30 are rails 36 bearing the fuel pins 18. Each of the rails shown in FIGS. 1 and 2 is formed by a sectional member in the form of a strip terminating in a semicylindrical widened portion 38. When the rail 31 is fitted on to the spindles, the widened portion is perpendicular to the axis thereof. The strip of each rail is formed with two holes through which the cylindrical portions of the spindles 30 can extend, the holes being of dimensions such that the rails are unable to be inclined at an angle large enough substantially to impede the supply of coolant. As illustrated in FIG. 4, in which a rail 36 is shown in chain lines, each hole is connected to the lower edge of the rail via a slot through which the rib 32 of the corresponding spindle extends.

The rails are elongated in the direction of flow of the heat-vehicling fluid and therefore create only a small load loss. For the same reason, the passage with which the unit 20 is formed has a conicity identical with that of the passage in the base 12 and is connected thereto without discontinunity.

The side of the plug 40 closing the terminal portion of each pin 18 is formed with a slot large enough transversely to receive the strip of a rail 36 terminating in a semi-cylindrical passage 42 adapted to trap the semi-cylindrical widened portion of the corresponding rail: once the fuel pins 18 belonging to the same layer have been slipped on to a rail and the latter has been put in place on the spindles, the pins of the layer are immobilised longitudinally in relation to the jacket, although they remain free to move slightly in the plane.

The advantage of the invention can be realised at once in view of the method of assembly which it allows. First of all, all the necessary layers of fuel pins are built up. To this end, the needles 18 of the corresponding layer are slipped on to each rail. The handling unit 20 is then placed on a suitable support which keeps its axis horizontal and keeps the spindles 30 orientated vertically. To receive the successive layers, V-shaped supports whose internal surfaces reproduce the straight section of the jacket sheath 11 are also put in place. In the case of a jacket of hexagonal cross-section, for instance, the V-shaped supports bound a volume corresponding to one half that of the jacket, between a flat surface thereof and the plane of symmetry parallel therewith. The layers are then stacked up one by one, their rails 36 being slipped on to the spindles 30 each time, until the pins rest on the V-shaped supports (in the case of the first layer) or on the preceding layer. The bundle assembly is thus built up. To enable it to be handled en bloc it is enough to slip the sheath 11 on to the bundle or to put a temporary retaining collar in place. The base 12 is then placed over the tubular handling unit 20, the bayonet-type coupling is locked, and the clamping screws 26 are put in place; the sheath 11 can then be pushed in completely to bring it into its final position in relation to the base, whereafter the sheath 11 is welded at the place 16.

Figures 6, 7:
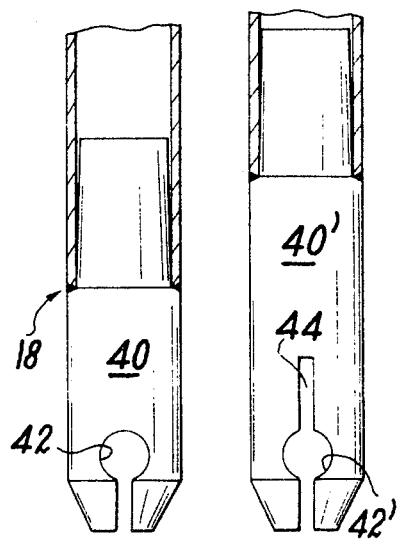
FIG. 6 is a sectional view of the end portion of a fuel pin of the device illustrated in FIG. 6, and FIG. 7, which is similar to FIG. 6, is a sectional view of a fuel pin adapted to a device forming a variant embodiment of the invention.

Clearly, the invention can be modified in many ways. More particularly, the rails 36 made up of machined sectional members of the kind shown in FIGS. 1, 2 and 4 can be replaced by rails made of deep-drawn sheet metal which are cheaper to manufacture. However, since rails of this kind have a flat portion forming a rib beyond the widened portion, pin plugs 40' of the kind shown in FIG. 7 must be used. The plugs 40' comprise beyond the semicylindrical passage 42' a notch 44 but on the other hand they have the disadvantage of being a few millimetres longer. Moreover, the notch 44 slightly weakens the plugs, which are split over a greater length than the ones referred to previously. This variant, as well as all variants in general which are technical equivalents, are covered by the present patent.

We claim:

1. A nuclear fuel assembly comprising a fluid coolant guide shroud, a bundle of parallel elongated fuel pins grouped continuously in a regular array in said shroud, comprising at least two parallel spindles securely connected to a support secured to said shroud and disposed transversely of the direction of circulation of the coolant in said shroud; and a plurality of parallel rails mounted on said spindles and at right angles thereto, said rails being slidable lengthwise of said spindles and end plugs for said pins slidably mounted on said rails to retain said pins longitudinally of said shroud, said shroud preventing said pins from sliding off said rails and said rails from sliding off said spindles.

2. An assembly as set forth in claim 1, said support including a tubular handling unit detachably fixed to said shroud.

3. An assembly as set forth in claim 2, said shroud including a thin tubular sheath enclosing said bundle of pins, and a solid base having an axial passage for the coolant, said handling unit being removably attached to said base.

4. An assembly as set forth in claim 3, said handling unit and said base having flared passages through which the coolant enters and disposed in continuation of one another when said handling unit is in place.

5. An assembly as set forth in claim 3, said handling unit being retained longitudinally in said base by a bayonet-type connection and detachable means preventing said tubular unit and said base from relative rotation.

6. An assembly as set forth in claim 1, each of said spindles having a cylindrical portion and a radial longitudinal rib attached to said support.

7. An assembly as set forth in claim 6, each of said rails having holes of cross-section mating with said cylindrical portion of said spindles, each of said rails having slots receiving the adjacent one of said ribs, each of said slots opening into the adjacent one of said holes.

8. An assembly as set forth in claim 7, each of said rails including a sectional member having a semi-cylindrical widened end portion, end plugs for said pins, and slots in said plugs mating with said end portions.

9. An assembly as set forth in claim 7, each of said rails having a widened portion and a rib connected to said portion, and each of said fuel pins having a semi-cylindrical passage mating with said portion, a slot from said passage to the pin end, a notch opening into said passage and a rib on the adjacent one of said rails extending into said notch.

References Cited

UNITED STATES PATENTS

| | | | |
|---|---|---|---|
| 3,574,058 | 4/1971 | Gumuchian | 176—68 |
| 3,150,057 | 9/1964 | Monson et al. | 176—81 |
| 2,961,393 | 11/1960 | Monson et al. | 176—78 X |
| 3,573,169 | 3/1971 | Gumuchian | 176—78 |
| 3,169,097 | 2/1965 | Meyers | 176—79 |
| 3,276,967 | 10/1966 | Dodd | 176—79 X |
| 3,291,698 | 12/1966 | Fortescue | 176—81 X |
| 3,303,099 | 2/1967 | Johnston | 176—79 X |

BENJAMIN R. PADGETT, Primary Examiner

G. G. SOLYST, Assistant Examiner

U.S. Cl. X.R.

176—76, 81